US012565943B2

(12) United States Patent
Ji et al.

(10) Patent No.: US 12,565,943 B2
(45) Date of Patent: Mar. 3, 2026

(54) PROTECTIVE DEVICES FOR SUBMARINE PIPELINES

(71) Applicant: CHANGZHOU UNIVERSITY, Changzhou (CN)

(72) Inventors: Hong Ji, Changzhou (CN); Jie Guo, Changzhou (CN); Ke Yang, Changzhou (CN); Zhixiang Xing, Changzhou (CN); Juncheng Jiang, Changzhou (CN); Yuchen Liu, Changzhou (CN); Wencong Shen, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 309 days.

(21) Appl. No.: 18/510,600

(22) Filed: Nov. 15, 2023

(65) Prior Publication Data

US 2024/0240732 A1 Jul. 18, 2024

Related U.S. Application Data

(63) Continuation of application No. PCT/CN2023/123213, filed on Oct. 7, 2023.

(30) Foreign Application Priority Data

Jan. 18, 2023 (CN) .......................... 202310082296.5

(51) Int. Cl.
F16L 1/12 (2006.01)
F16L 9/18 (2006.01)
(Continued)

(52) U.S. Cl.
CPC ............. F16L 1/123 (2013.01); G01M 3/243 (2013.01)

(58) Field of Classification Search
CPC ..... F16L 1/00; F16L 1/12; F16L 1/123; F16L 7/00–02; F16L 9/18; F16L 57/00–06; G01M 3/00; G01M 3/24; G01M 3/243
See application file for complete search history.

(56) References Cited

U.S. PATENT DOCUMENTS 9,140,385 B2 * 9/2015 Meijer .................. B63B 21/663
2020/0040481 A1 2/2020 Ding et al.
(Continued)

FOREIGN PATENT DOCUMENTS

CN 107747685 A * 3/2018 ............... F17D 5/02
CN 207349602 U 5/2018
(Continued)

OTHER PUBLICATIONS

Machine Translation of CN-113932091-a (Year: 2022).*
(Continued)

*Primary Examiner* — Nguyen Q. Ha
(74) *Attorney, Agent, or Firm* — METIS IP LLC

(57) ABSTRACT

Embodiments of the present disclosure provide a protective device for a submarine pipeline, comprising an internal pipeline, a protective casing, and a support explosion-proof assembly; wherein the protective casing is disposed outside the internal pipeline, and a cavity body is disposed between the protective casing and the internal pipeline; the support explosion-proof assembly is disposed in the cavity body; the support explosion-proof assembly includes a plurality of support columns, the support columns are disposed in the cavity body, and one end of the support columns away from the protective casing supported on the internal pipeline, the plurality of the support columns disposed at intervals in a circumferential direction along the internal pipeline, and an explosion-proof baffle with elastic deformation capability is disposed between two adjacent support columns.

14 Claims, 7 Drawing Sheets

(51) Int. Cl.
F16L 57/00 (2006.01)
G01M 3/24 (2006.01)

(56) References Cited

U.S. PATENT DOCUMENTS

2024/0167609 A1* 5/2024 Ji .............................. F16L 57/04
2024/0240732 A1 7/2024 Ji et al.

FOREIGN PATENT DOCUMENTS

| CN | 109869545 | A | | 6/2019 | |
|----|-----------|---|---|--------|---|
| CN | 210716533 | U | | 6/2020 | |
| CN | 112344987 | A | * | 2/2021 | .............. B63C 1/00 |
| CN | 213929977 | U | | 8/2021 | |
| CN | 214899913 | U | | 11/2021 | |
| CN | 113833917 | A | | 12/2021 | |
| CN | 113932091 | A | * | 1/2022 | .............. F16L 55/02 |
| CN | 216843482 | U | * | 6/2022 | |
| CN | 217559234 | U | | 10/2022 | |
| KR | 20170082816 | A | | 7/2017 | |
| RU | 2593330 | C1 | | 8/2016 | |
| RU | 2741178 | C2 | | 1/2021 | |

OTHER PUBLICATIONS

Machine Translation of CN-216843482-U (Year: 2022).*
Machine Translation of CN-112344987-A (Year: 2021).*
Machibne Translation of CN-107747665-A (Year: 2018).*
Zhu, Qingjie et al., Influencing factors and protective measures of buried natural gas pipeline leakage, Chinese Journal of Environmental Engineering, 12(2): 417-420, 2018.
International Search Report in PCT/CN2023/123213 mailed on Dec. 21, 2023, 7 pages.
Written Opinion in PCT/CN2023/123213 mailed on Dec. 21, 2023, 8 pages.

* cited by examiner

5

1

PROTECTIVE DEVICES FOR SUBMARINE PIPELINES

CROSS REFERENCE TO RELATED APPLICATIONS

This application is a Continuation of International Application No. PCT/CN2023/123213, filed on Oct. 7, 2023, which claims priority to Chinese patent application No. 202310082296.5, filed on Jan. 18, 2023, the entire contents of each of which are incorporated herein by introduction.

TECHNICAL FIELD

The present disclosure relates to the technical field of protective devices, and in particular, to a protective device for a submarine pipeline.

BACKGROUND

Along with the continuous expansion of the world's offshore oil industry, the mileage of submarine pipelines is growing rapidly. The safety of submarine pipelines is crucial to the security of oil and gas production, transport, and sales. Once the submarine pipelines are damaged, it will have a significant impact on the environment. For example, a ruptured pipeline may release large quantities of harmful gases such as natural gas, methane, and hydrogen sulfide, which affects the marine ecosystem and cause damage to living organisms. Released natural gas will explode when it encounters an ignition source, and ruptured pipelines cause fires and explosions, posing a serious threat to the ocean and surrounding areas. At the same time, the ruptured pipelines lead to gas leaks and production interruptions, which will be very costly to the businesses and economies involved. When a gas pipeline is damaged due to natural or man-made reasons, it takes a lot of time to replace or repair the pipeline, which not only damages the environment but also costs a lot of money.

In order to reduce the risk of damage to submarine pipelines and to increase the service life of submarine pipelines, additional protective devices are installed outside the submarine pipelines. However, most of the protection devices are ineffective and cannot be freely disassembled for replacement, maintenance, or adjustment.

Therefore, it is desired to provide a protective device that is flexibly operated for a submarine pipeline, henceforth effectively reducing the risk of damage to submarine pipelines.

SUMMARY

One of the embodiments of the present disclosure provides a protective device for a submarine pipeline, comprising an internal pipeline, wherein the protective device further comprises: a protective casing disposed outside the internal pipeline, a cavity body disposed between the protective casing and the internal pipeline; and at least one support explosion-proof assembly disposed in the cavity body; the support explosion-proof assembly including a plurality of support columns, the support columns disposed in the cavity body, one end of the support columns away from the protective casing supported on the internal pipeline, the plurality of the support columns disposed at intervals in a circumferential direction along the internal pipeline, and an explosion-proof baffle with elastic deformation capability disposed between two adjacent support columns.

In some embodiments, the protective device comprises a plurality of support explosion-proof assemblies disposed at intervals along an axial direction of the internal pipeline, and a buffer space is disposed between two adjacent support explosion-proof assemblies.

In some embodiments, the explosion-proof baffle has a trapezoidal cross-section along a radial direction of the internal pipeline, and a lower bottom edge of the explosion-proof baffle is connected to an inner peripheral wall of the protective casing.

In some embodiments, a first buffer chamber is provided between waist edges of both sides of the explosion-proof baffle and a support column corresponding to the explosion-proof baffle, and a second buffer chamber is provided between an upper bottom edge of the explosion-proof baffle and the internal pipeline.

In some embodiments, the upper bottom edge of the explosion-proof baffle is curved.

In some embodiments, a cushioning rubber pad is provided between the support columns and the internal pipeline.

In some embodiments, a silicone layer is provided on an inner peripheral wall of the protective casing and on an outer peripheral wall of the internal pipeline.

In some embodiments, the protective casing is a Huff structure.

In some embodiments, the protective casing is provided with a connecting flange, the connecting flange is provided with a threaded groove hole, and the threaded groove hole is provided with a bolt.

In some embodiments, the connecting flange is provided with a sealing groove.

In some embodiments, a pressure sensor is provided in the buffer space.

In some embodiments, the protective device further comprises at least one processor and at least one outer sensor, the at least one outer sensor is deployed on the protective casing and in contact with seawater, the at least one outer sensor includes at least one of a vibration sensor, a pressure sensor, and a flow rate sensor; and the at least one processor is configured to: determine a sequence of sea current features around the submarine pipeline based on sensing data obtained by the at least one outer sensor; and determine early warning information based on the sequence of sea current features.

In some embodiments, the processor is configured to: determine a predicted future abnormality probability of the submarine pipeline based on a submarine environment feature map through a prediction model, the prediction model being a machine learning model, and the submarine environment feature map being constructed based on a spatial location distribution of the submarine pipeline; and in response to the predicted future abnormality probability satisfying a predetermined abnormality condition, generate the early warning information and sending the early warning information to a remote control center.

In some embodiments, the protective device further comprises a plurality of acoustic wave assemblies, the plurality of acoustic wave assemblies is disposed at intervals along an axial direction of the protective casing, the plurality of acoustic wave assemblies include an acoustic wave transmitting unit and an acoustic wave receiving unit; and the at least one processor is further configured to: control the acoustic wave transmitting unit to transmit probing acoustic waves at a predetermined period, and control the acoustic wave receiving unit to receive reflected echoes; determine whether a predetermined repelling condition is satisfied based on a sequence of reflected echoes, the sequence of reflected echoes being formed based on the reflected echoes received by the acoustic wave receiving unit; and in response to the predetermined repelling condition being satisfied, send a repelling instruction to the acoustic wave transmitting unit to control the acoustic wave transmitting unit to transmit repelling acoustic waves.

In some embodiments, the processor is further configured to: perform a coarse identification on the sequence of reflected echoes using a predetermined algorithm to determine a coarse identification result; in response to the coarse identification result satisfying a predetermined identification condition, perform a precise identification through a biometric model to determine a fish school distribution feature within a predetermined range of the submarine pipeline; and determine whether the predetermined repelling condition is satisfied based on the fish school distribution feature.

By installing the protective casing and the support explosion-proof assembly outside the internal pipeline, the protective casing prevents oil and gas from leaking out of the internal pipeline when an explosion occurs in the internal pipeline, and the support explosion-proof assembly absorbs a shock wave to prevent the protective casing from being broken, which buys enough time for maintenance personnel to make repairs, reduces or even prevents the leakage of oil and gas, thereby minimizing the damage to the environment and saving the financial losses caused by the leakage.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, where.

Figure 1:
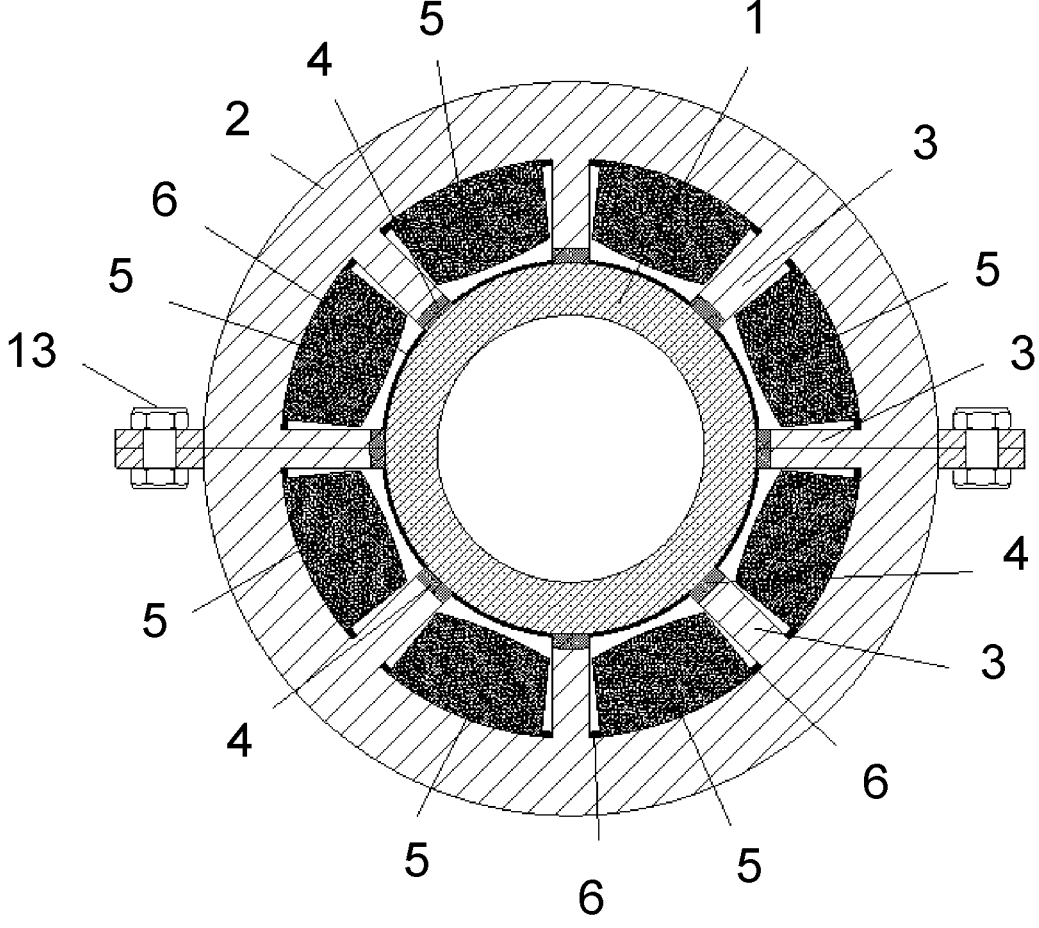
FIG. 1 is a schematic diagram illustrating an exemplary radial section view of a protective device for a submarine pipeline according to some embodiments of the present disclosure.

Accompanying drawings of the present disclosure includes: 1. internal pipeline, 2. protective casing, 3. support column, 4. cushioning rubber pad, 5. explosion-proof baffle, 6. silicone layer, 7. pressure sensor, 8. connecting flange; 9. threaded groove hole, 10. sealing groove, 11. buffer space, 12. position-limiting piece, 13. bolt.

DETAILED DESCRIPTION

In order to more clearly illustrate the technical solutions of the embodiments of the present disclosure, the accompanying drawings to be used in the description of the embodiments will be briefly described below. It will be apparent that the accompanying drawings in the following description are only some examples or embodiments of the present disclosure, and that the present disclosure may be applied to other similar scenarios in accordance with these drawings without creative labor for those of ordinary skill in the art. Unless obviously obtained from the context or the context illustrates otherwise, the same numeral in the drawings refers to the same structure or operation.

Unless the context clearly suggests an exception, the words "one," "a," "kind," and/or "the" do not refer specifically to the singular, but may include the plural as well. In general, the terms "including" and "comprising" suggest only the inclusion of clearly identified steps and elements, which do not constitute an exclusive list, and the method or apparatus may also include other steps or elements.

It should be understood that for the description of the present disclosure, the words "center", "upper surface", "lower surface", "top", "bottom", "inside", "outside", "axial", "radial", "peripheral", "external" or the like, indicate positional relationships based on the positional relationships shown in the accompanying drawings, and do not indicate that the device, assembly, or unit referred to must have a specific positional relationship, and are not to be construed as a limitation of the present disclosure. However, the words may be replaced by other expressions if other words would accomplish the same purpose.

In the description of the present disclosure, it should be noted that, unless otherwise expressly specified and limited, the terms "install", "connection", and "link" are to be understood in a broad sense, e.g., a fixed connection, a detachable connection or an integral connection; a mechanical connection or an electrical connection; a direct connection or an indirect connection through an intermediate medium; or a connection within two elements. To those ordinary skills in the art, the specific meaning of the above terms in the present disclosure will be understood in the context of the particular case.

Embodiments of the present disclosure provide a protective device for a submarine pipeline, comprising: an internal pipeline, a protective casing, and a support explosion-proof assembly, the support explosion-proof assembly being disposed between the internal pipeline and the protective casing to support the protective casing and to prevent the protective casing from being damaged due to impact. Further, the protective device may also provide an early warning by means of an outer sensor provided on the protective casing, so that a remote control center may be informed of an abnormality of the protective device in advance in order to arrange for maintenance by personnel.

Figure 2:
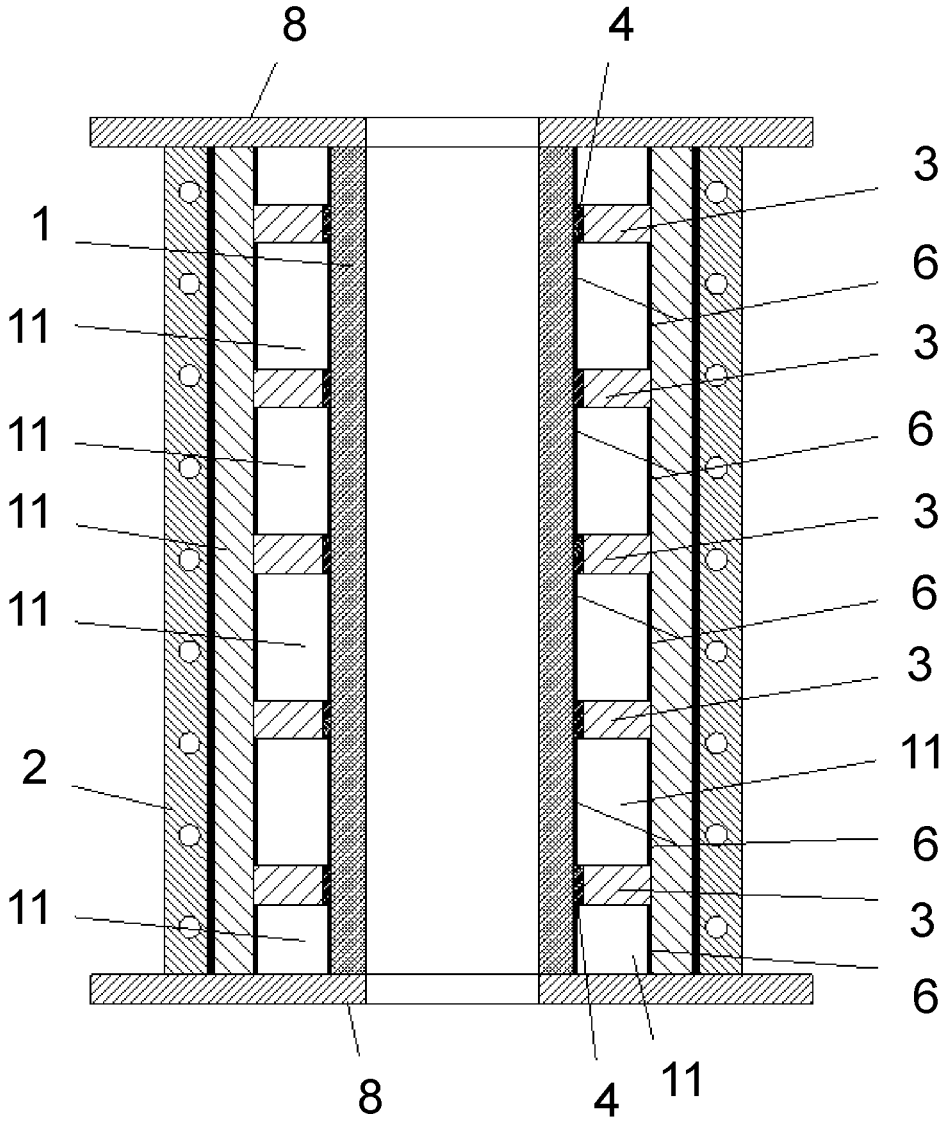
FIG. 2 is a schematic diagram illustrating an exemplary axial sectional view I of the protective device for a submarine pipeline according to some embodiments of the present disclosure.
Figure 3:
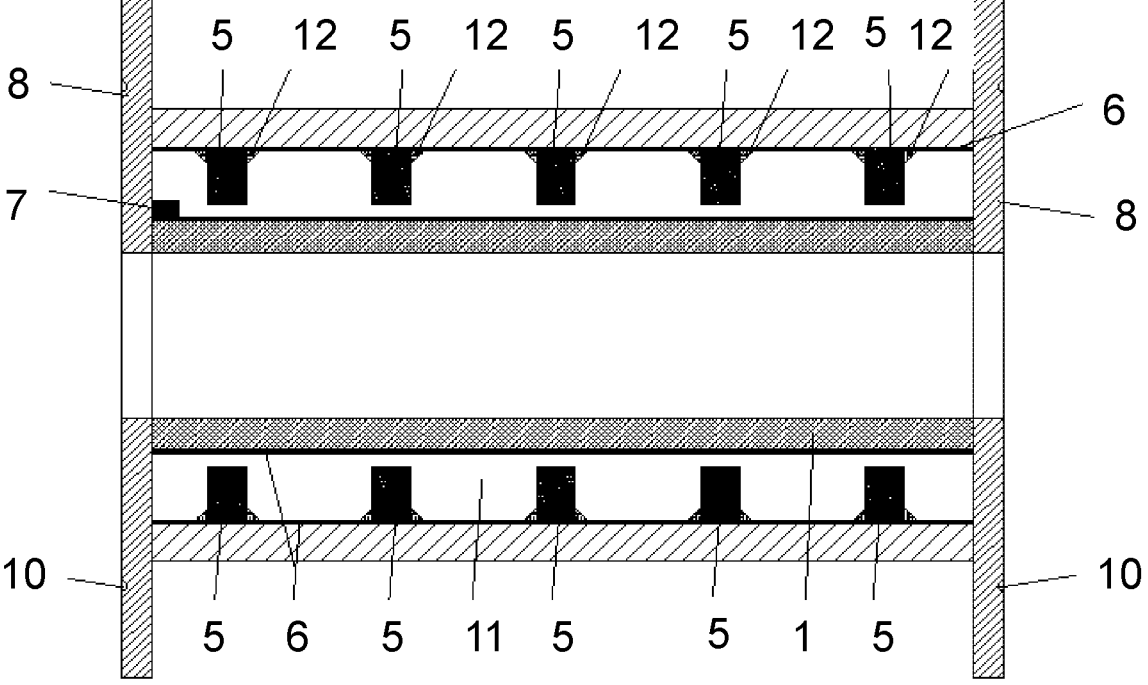
FIG. 3 is a schematic diagram illustrating an exemplary axial sectional view II of the protective device for a submarine pipeline according to some embodiments of the present disclosure.

FIG. 1 is a schematic diagram illustrating an exemplary radial sectional view of a protective device for a submarine pipeline according to some embodiments of the present disclosure. FIG. 2 is a schematic diagram illustrating an exemplary axial sectional view I of the protective device for a submarine pipeline according to some embodiments of the present disclosure. FIG. 3 is a schematic diagram illustrating an exemplary axial sectional view II of the protective device for a submarine pipeline according to some embodiments of the present disclosure.

As shown in FIGS. 1-3, in some embodiments, the protective device includes an internal pipeline 1, a protective casing 2, and a support explosion-proof assembly.

In some embodiments, the protective casing 2 is disposed outside the internal pipeline 1, and there is a cavity body between the protective casing 2 and the internal pipeline 1;

the support explosion-proof assembly is disposed inside the cavity body; the support explosion-proof assembly includes a plurality of support columns 3, the support columns 3 are disposed inside the cavity body, and one end of the support columns 3 that is away from the protective casing 2 is supported on the internal pipeline 1, the plurality of support columns 3 are disposed at intervals in a circumferential direction along the internal pipeline 1, and an explosion-proof baffle 5 having an elastic deformation capability is disposed between two support columns 3.

The protective casing 2 is a structure that protects the internal pipeline 1 from external impact and damage. In some embodiments, the protective casing 2 may be in a form of a hollow cylinder. The internal pipeline 1 is located inside the hollow cylinder and the internal pipeline 1 is not in contact with an inner cylinder wall of the hollow cylinder, so as to construct a cavity body between the hollow cylinder and the internal pipeline 1.

As shown in FIGS. 1-3, in some embodiments, a silicone layer 6 may be disposed on an inner peripheral wall of the protective casing 2 and on an outer peripheral wall of the internal pipeline 1. If a hole is created in the internal pipeline 1, the silicone layer 6 may create an initial cushion for internally leaked gas, reducing the impact of the leaked gas on the internal pipeline 1 and the protective device. In some embodiments, a thickness of the silicone layer may be set to a variety of thicknesses as desired. For example, the thickness of the silicone layer may be set to 3 cm, 5 cm, 8 cm. In some embodiments, the thickness of the silicone layer may be related to a diameter of the internal pipeline, e.g., a ratio of the thickness of the silicone layer to the diameter of the internal pipeline may be 1:100, 3:100, 5:100, or the like.

As shown in FIGS. 1-3, in some embodiments, the protective casing 2 may be a Huff structure. By designing the protective casing 2 as the Huff structure, it is convenient to install the protective casing 2 on the internal pipeline 1. During maintenance, since the protective casing 2 is the Huff structure, the mounting and dismounting of the protective device may be carried out by means of a bolt 13, and a removability of the Huff structure makes an operation process such as regular maintenance and replacement of a protective pipeline more convenient. See FIG. 5 for a more detailed description of the protective casing 2.

The support explosion-proof assembly is an assembly that acts as a support and cushion between the protective casing 2 and the internal pipeline 1.

In some embodiments, the support explosion-proof assembly includes a plurality of support columns 3. In some embodiments, a count of support columns 3 may be related to an outer diameter of the internal pipeline 1. For example, the larger the outer diameter of the internal pipeline 1 is, the greater the count of the support column 3 may be.

The support column 3 is a main structure in the support explosion-proof assembly. In some embodiments, the support column 3 may be made with the protective casing 2 by an integrated process, e.g., injection molding, inverted molding, etc. In some embodiments, the support column 3 may be connected to the protective casing 2 by fastener connection, bonding, welding, etc. In some embodiments, a length of the support column 3 may be equal to a difference between the outer diameter of the internal pipeline 1 and an inner diameter of the protective casing 2, and an end of the support column 3 near the protective casing 2 is connected to the protective casing 2 so that another end of the support column 3 away from the protective casing 2 is supported on the internal pipeline 1. In some embodiments, the plurality of support columns 3 may be spaced apart in an equally spaced or non-equally spaced manner in the circumferential direction along the internal pipeline 1.

In some embodiments, a cushioning rubber pad 4 is disposed between the support column 3 and the internal pipeline 1. When a shock wave generated by an explosion is not uniform along a radial direction of the internal pipeline 1, it will cause an asynchronous vibration along the radial direction of the internal pipeline 1 and the protective casing 2. Setting the cushioning rubber pad 4 may relieve such vibration and prevent the support column 3 from toppling through the internal pipeline 1 or the protective casing 2 while ensuring the support function of the support column 3.

An explosion-proof baffle 5 is a main buffer structure in the support explosion-proof assembly, which is used to mitigate the shock wave created by the explosion.

In some embodiments, the explosion-proof baffle 5 may be connected to the inner peripheral wall of the protective casing 2. In some embodiments, the explosion-proof baffle 5 may be connected to the protective casing 2 in a variety of ways. For example, the explosion-proof baffle 5 may be made integrally with the protective casing 2, or, for example, the explosion-proof baffle 5 may be connected or snap-fit to the protective casing 2 by means of fasteners.

In some embodiments, the explosion-proof baffle 5 may be made of an explosion-proof material. In some embodiments, the explosion-proof baffle 5 may be made of a material that has the ability to deform elastically. Examples include rubber, latex, and EPS (polystyrene foam). The explosion-proof baffle 5 having an elastic deformation capability may effectively reduce the impact generated by the explosion of the internal pipeline 1 and a destructive force of the shock wave on the internal pipeline 1.

In some embodiments, a cross-sectional shape of the explosion-proof baffle 5 along the radial direction of the internal pipeline 1 may be disposed in a variety of shapes, e.g., fan-shaped, quadrilateral, or the like. For a more detailed description of the shape of the explosion-proof baffle 5, please see the illustration of FIG. 4. In some embodiments, a width of the explosion-proof baffle 5 along an axial direction of the internal pipeline 1 may be set according to a demand, for example, it may be set to 10 cm, 20 cm, 25 cm, or the like.

In some embodiments, the explosion-proof baffle 5 is provided between two adjacent support columns 3. In some embodiments, a plurality of support columns 3 and a plurality of explosion-proof baffles 5 may be included in one support explosion-proof assembly, and the plurality of support columns 3 and the plurality of explosion-proof baffles 5 may be disposed at an evenly spaced interval in the circumferential direction along the internal pipeline 1. In some embodiments, a plurality of explosion-proof baffles 5 and support columns 3 in the circumferential direction along the internal pipeline 1 may form a support explosion-proof assembly. As shown in FIG. 1, in a radial cross-section corresponding to a radial sectional view, the support columns 3 are uniformly distributed in eight in the circumferential direction along the internal pipeline 1, and explosion-proof baffles 5 with the elastic deformation capability are disposed between each of the two adjacent support columns 3, so that the eight support columns 3 and the explosion-proof baffles 5 between the eight support columns 3 together form a support explosion-proof assembly.

As shown in FIGS. 2 and 3, in some embodiments, the support explosion-proof assembly includes a plurality of support explosion-proof assemblies, the plurality of support explosion-proof assemblies is spaced apart along the axial direction of the internal pipeline 1, and there is a buffer space 11 between two adjacent support explosion-proof assemblies. For example, as shown in FIGS. 2 and 3, five support explosion-proof assemblies may be spaced apart along the axial direction of the internal pipeline 1, and there is the buffer space 11 between every two adjacent support explosion-proof assemblies.

The buffer space 11 may play a buffer role along the axial direction, the shock wave generated by the explosion may be continuously reflected and absorbed in the buffer space 11, and at the same time, such structure can transfer a part of the shock wave that can not be absorbed to an adjacent buffer space 11 through a gap between the explosion-proof baffle 5 and the internal pipeline 1, so that the shock wave may be absorbed and weakened continuously by support explosion-proof assemblies and a plurality of buffer spaces 11.

As shown in FIG. 3, in some embodiments, a pressure sensor 7 is disposed inside the buffer space 11. The pressure sensor 7 may be provided on the outer peripheral wall of the internal pipeline 1 located in the buffer space 11, or on the inner peripheral wall of the protective casing 2 located in the buffer space 11, and may also be disposed in other feasible positions. By setting the pressure sensor 7 in the buffer space 11, when an explosion inside a pipeline occurs, the shock wave formed by the explosion may cause a pressure in the buffer space 11 to rise suddenly, at which the pressure sensor 7 is able to detect a sudden change in pressure and transmit a detection signal to a remote control center. By setting the pressure sensor 7, it is possible to quickly and accurately locate a damage in the internal pipeline 1, so as to send personnel to timely repair or replace a submarine pipeline.

In some embodiments, the inner peripheral wall of the protective casing 2 is provided with a position-limiting piece 12, the position-limiting piece 12 is provided along the axial direction of the protective casing 2 on both sides of the explosion-proof baffle 5 respectively, the position-limiting piece 12 is able to limit the explosion-proof baffle 5 so as to avoid the explosion-proof baffle 5 from being displaced by the influence of gravity and other factors. The position-limiting piece 12 may be in various forms, for example, the position-limiting piece 12 may be a triangular block. The triangular structure is stable and not easy to deform and may play a better role in position limiting. In some embodiments, the position-limiting piece 12 may also be a quadrilateral, a sector, or any other shape capable of acting as a position-limiting piece. In some embodiments, a count of position-limiting pieces 12 is related to the count of explosion-proof baffles. For example, the count of position-limiting pieces 12 is twice the count of explosion-proof baffles.

When using the aforementioned protective device for a submarine pipeline, in the event of the explosion in the internal pipeline 1, the shock wave generated can propagate axially along the protective casing 2. The explosion-proof baffle 5 is made of explosion-resistant material and has a certain level of elasticity. The impact of the shock wave causes deformation of the explosion-proof baffle 5 and the explosion-proof baffle 5 oscillates continuously under the impact of the shock wave, gradually reducing the impact generated by the explosion in the internal pipeline 1, which mitigates the damage caused by the shock wave to the internal pipeline 1. The spaced explosion-proof baffles 5 further dissipate the impact, effectively preventing severe damage to the environment and posing serious threats to the ocean and surrounding areas that could result from the rupture and explosion of the internal pipeline 1.

Figure 4:
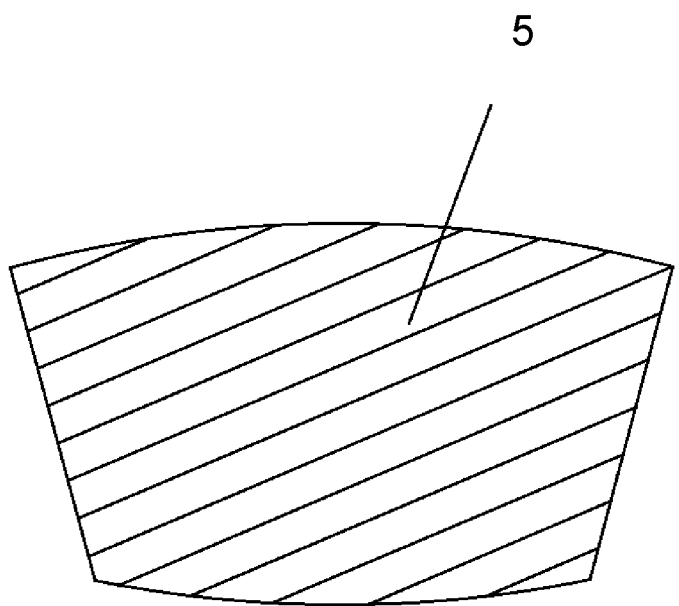
FIG. 4 is a schematic diagram illustrating an exemplary cross-sectional view of an explosion-proof baffle according to some embodiments of the present disclosure.

FIG. 4 is a schematic diagram illustrating an exemplary cross-sectional view of an explosion-proof baffle 5 according to some embodiments of the present disclosure.

As shown in FIG. 4, in some embodiments, a cross-sectional shape of the explosion-proof baffle 5 along a radial direction of the internal pipeline 1 may be set in a trapezoidal shape, so that the explosion-proof baffle 5 can better dissipate the impact generated by an explosion in a pipeline. In some embodiments, a lower bottom edge of the explosion-proof baffle 5 (i.e., a lower bottom edge of a trapezoidal cross-section of the explosion-proof baffle 5 along the radial direction of the internal pipeline 1) may be connected to an inner peripheral wall of the protective casing 2 by bonded or welded. The lower bottom edge of the explosion-proof baffle 5 is close to the protective casing 2. In some embodiments, at least one waist edge and/or at least one bottom edge of the trapezoidal cross-section may be in a curved form or in a straight form.

As shown in FIGS. 1 and 4, in some embodiments, a void between the explosion-proof baffle 5, the support column 3, and the internal pipeline 1 may form a buffer chamber. In some embodiments, there is a first buffer chamber between waist edges of the explosion-proof baffle 5 (i.e., waist edges of the trapezoidal cross-sectional shape of the explosion-proof baffle 5 along the radial direction of the internal pipeline 1) and support columns 3 corresponding to the waist edges, and there is a second buffer chamber between an upper bottom edge of the explosion-proof baffle 5 and the internal pipeline 1.

The first buffer chamber and the second buffer chamber may better absorb the impact, and the buffer space 11 between two adjacent support explosion-proof assemblies may reflect a shock wave generated by the explosion, so that the shock waves may cancel each other out, thus gradually weakening the shock wave.

As shown in FIGS. 1 and 4, in some embodiments, the upper bottom edge of the explosion-proof baffle 5 (i.e., an upper bottom edge of the trapezoidal cross-sectional shape of the explosion-proof baffle 5 along the radial direction of the internal pipeline 1) is curved. The upper bottom edge of the explosion-proof baffle 5 is close to the internal pipeline. In some embodiments, a projection of the upper bottom edge of the explosion-proof baffle 5 is oriented towards the internal pipeline 1.

The curved upper bottom edge enables the explosion-proof baffle 5 to increase a contact surface with the shock wave with a side of the explosion-proof baffle 5 that is close to the internal pipeline (i.e., a face formed by a plurality of upper bottom edges of the explosion-proof baffle 5 with a trapezoidal cross-sectional shape along the radial direction of the internal pipeline 1, also referred to as an upper bottom-surface), so as to enable the explosion-proof baffle 5 to better absorb and dissipate the shock wave.

Figure 5:
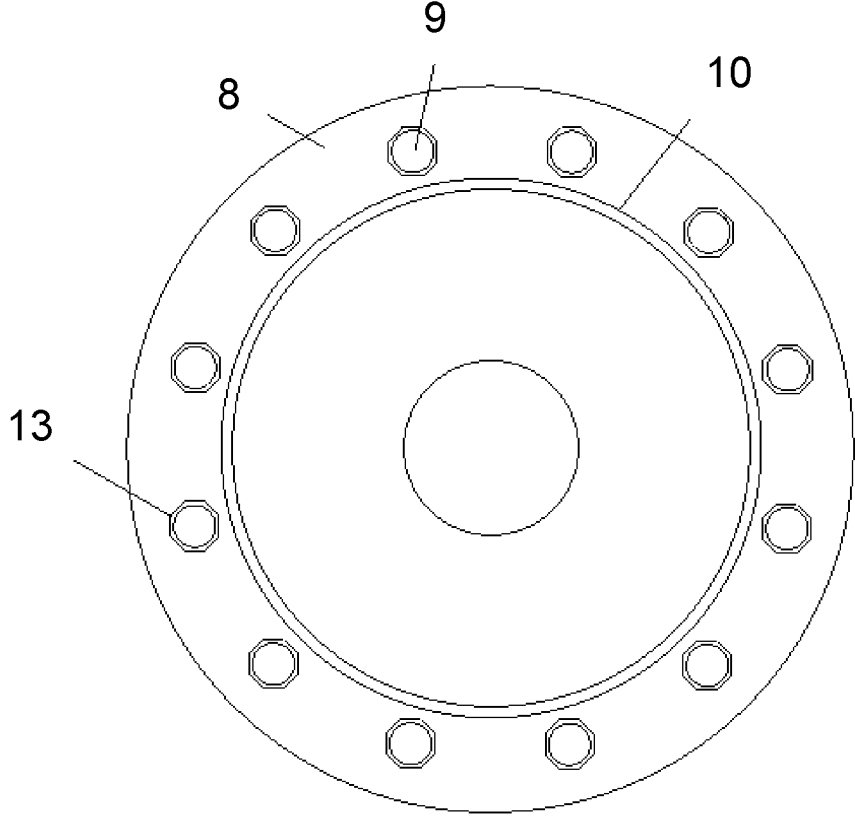
FIG. 5 is a schematic diagram illustrating an exemplary main view of the protective device for a submarine pipeline according to some embodiments of the present disclosure.

FIG. 5 is a schematic diagram illustrating an exemplary main view of a protective device for a submarine pipeline according to some embodiments of the present disclosure.

As shown in FIGS. 1-FIG. 5, in some embodiments, connecting flanges 8 may be disposed at both ends of the protective casing 2, the connecting flange 8 is provided with a threaded groove hole 9, and the threaded groove hole 9 is provided with a bolt 13.

Connecting flanges 8 corresponding to two adjacent protective casings 2 may be tightly coupled by means of bolts 13. By disposing the connecting flange 8, the connection and disassembly of adjacent protective casings 2 are more convenient.

As shown in FIGS. 3 and 5, in some embodiments, the connecting flange 8 is provided with a sealing groove 10. In some embodiments, the sealing groove 10 is provided with a sealing ring, and a sealing ring between two adjacent protective casings may be squeezed 2 when the two adjacent protective casings are connected by the connecting flanges 8, which can enhance the sealing at a connection of the two adjacent protective casings 2.

Figure 6:
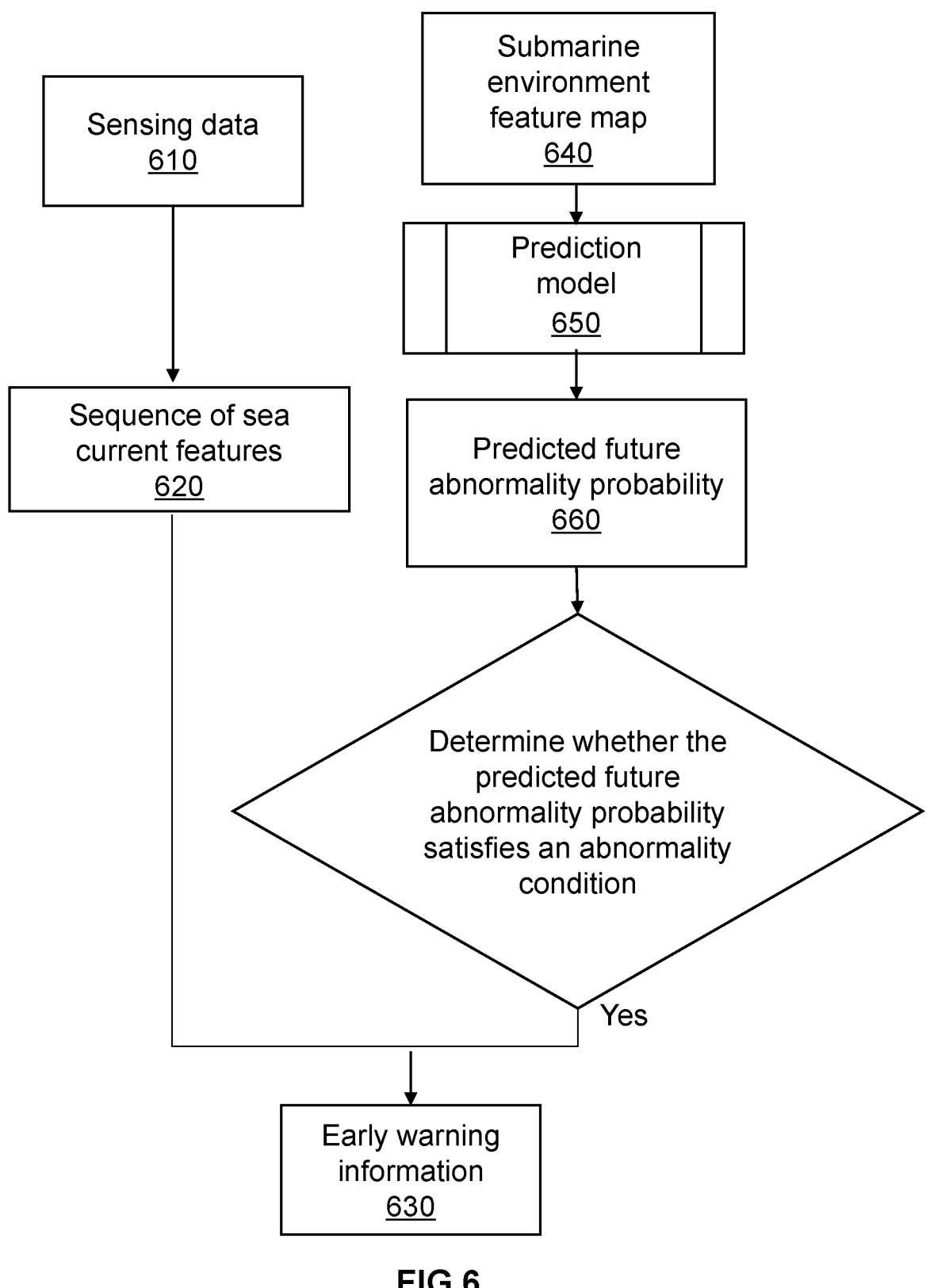
FIG. 6 is a schematic diagram illustrating an exemplary determination of early warning information according to some embodiments of the present disclosure.

In some embodiments, the protective device further includes a processor and an outer sensor. In some embodiments, sensing data obtained by the outer sensor may be sent to a processor for processing, where the processor determines early warning information. FIG. 6 is a schematic diagram illustrating an exemplary determination of early warning information according to some embodiments of the present disclosure.

Referring to FIG. 6, in some embodiments, a processor may determine a sequence of sea current features 620 around a submarine pipeline based on sensing data 610 obtained by an outer sensor, and determine early warning information 630 based on the sequence of sea current features 620.

The outer sensor may be used to measure data information related to seawater outside a protective casing.

In some embodiments, the outer sensor is deployed on the protective casing and is in contact with seawater. The outer sensor may be deployed on the protective casing at a predetermined distance, and the submarine pipeline is divided into one or more pipeline segments (hereinafter referred to as a pipeline segment) at a predetermined distance.

In some embodiments, the outer sensor includes at least one of a vibration sensor, a pressure sensor, and a flow rate sensor.

The vibration sensor is a sensor used to measure sensing data of vibration. The sensing data of vibration refers to sensing data information related to vibration in the submarine pipeline. For example, the sensing data of vibration includes a vibration frequency, a vibration amplitude, or the like.

The pressure sensor is a sensor used to measure sensing data of pressure. The sensing data of pressure refers to sensing data information related to a pressure to which the submarine pipeline is subjected. For example, the sensing data of pressure includes a pressure magnitude, a rate of pressure change, or the like.

The flow sensor is a sensor used to measure sensing data of flow. The sensing data of flow refers to sensing data information related to a flow of seawater outside the submarine pipeline. For example, the sensing data of flow includes a flow direction and flow rate of seawater.

The sea current feature is data information that characterizes a flow of seawater. In some embodiments, the sea current feature includes a current strength and a current direction.

The sequence of sea current features is a sequence formed by sea current features. In some embodiments, the sequence of sea current features includes at least one sea current feature obtained at one moment. For example, the sequence of sea current features may be represented by {(a1, b1), (a2, b2), . . . }, where (a1, b1) denotes a sea current feature at a moment 1, (a2, b2) denotes a sea current feature at a moment 2, a1 and a2 are current strengths at corresponding moments, and b1 and b2 are current directions at corresponding moments.

The current strength is a strength of seawater impacting the submarine pipeline as it flows. The larger the current strength, the more likely the damage is caused to the submarine pipeline as seawater flows.

In some embodiments, the processor may determine the current strength in the sea current feature via a strength relationship table based on the sensing data of pressure and sensing data of flow. The strength relationship table is a table of a correspondence between the sensing data of pressure, the sensing data of flow, and the current strength, and the strength relationship table may be constructed based on a correspondence between historical sensing data of pressure, historical sensing data of flow, and a historical current strength.

In some embodiments, the current strength is positively correlated with the sensing data of vibration and the sensing data of pressure. For example, the greater the frequency and amplitude of vibration of the submarine pipeline and/or the greater the rate of pressure change on the submarine pipeline, the greater the current strength.

In some embodiments, the processor may obtain a current direction at different moments by means of a current speed sensor.

The early warning information is used to warn of a possible damage to the submarine pipeline. For example, the early warning information such as "excessive pressure on a certain submarine pipeline segment".

In some embodiments, the processor may determine the early warning information in a variety of ways. For example, if current strengths at a successive predetermined count of moments in a sequence of sea current features corresponding to a certain submarine pipeline segment are greater than a predetermined strength threshold, the processor may generate early warning information that the submarine pipeline segment is likely to be damaged, and send the early warning information to a remote control center. For example, if it is detected that a predetermined count of pipeline segments are all subjected to a current strength greater than the predetermined strength threshold during a predetermined time period, the processor may generate the early warning information that the predetermined count of pipeline segments may be damaged and send the early warning information to the remote control center. The predetermined count, the predetermined strength threshold, and the predetermined time period may all be predetermined by staff or the processor based on historical experience.

As shown in FIG. 6, in some embodiments, the processor may determine a predicted future abnormality probability 660 for the submarine pipeline via a prediction model 650 based on a submarine environment feature map 640; and determine whether the predicted future abnormality probability satisfies a predetermined abnormality condition, and in response to a determination that the predicted future abnormality probability satisfies the predetermined abnormality condition, the processor generates early warning information 630 and send the early warning information 630 to the remote control center.

The prediction model is a machine learning model used to determine the predicted future abnormality probability of the submarine pipeline. In some embodiments, the prediction model is a Graph Neural Network (GNN) model. The prediction model may also be other graph models, such as a Graph Convolutional Neural Network (GCNN) model, or other processing layers may be added to the graph neural network model, or processing manners of the graph neural network model may be modified, and so on.

In some embodiments, an input to the prediction model includes the submarine environment feature map and an output includes the predicted future abnormality probability of the submarine pipeline. An output of a node of the GNN corresponds to a predicted future abnormality probability of a pipeline segment.

The submarine environment feature map refers to a graph that characterizes a submarine environment. The graph is a data structure consisting of nodes and edges with edges connecting nodes, and nodes and edges may have attributes (i.e., a node feature and an edge feature below).

Nodes of the submarine environment feature map indicate a pipeline segment where each set of outer sensors is located. The each set of outer sensors may include at least one of the vibration sensor, the pressure sensor, or the flow rate sensor. Submarine pipelines of different branches are divided into different pipeline segments, and submarine pipelines are divided into a plurality of pipeline segments according to a predetermined length. The predetermined length may be predetermined by the staff or processor based on historical experience. A node feature corresponding to a node of the submarine environment feature map is a sequence of sea current features obtained based on a set of outer sensors at that node.

Edges of the submarine environment feature map indicate that pipeline segments corresponding to two nodes belong to a same pipeline (including a pipeline with a bend) and a pipeline distance between the two nodes is less than a predetermined distance threshold. The predetermined distance threshold may be predetermined by the staff or processor based on historical experience. The pipeline distance is a sum of lengths of the pipeline segments corresponding to two nodes. An edge feature corresponding to an edge of the submarine environment feature map includes the pipeline distance between two nodes and a transportation feature of a pipeline to which it belongs. The transportation feature is data information relating to oil or natural gas transported in a submarine pipeline, for example, a temperature, a pressure, and a flow rate of the oil or natural gas. In some embodiments, the processor may obtain the transportation feature via an internal sensor disposed on an inner wall of the pipeline. The internal sensor may include but is not limited to, the temperature sensor, the pressure sensor, and the flow rate sensor.

The predicted future abnormality probability is a predicted probability of an abnormality occurring in a submarine pipeline or a pipeline segment.

In some embodiments, the prediction model may be obtained by training a large count of first training samples with a first label in various manners. For example, the prediction model may be trained based on the gradient descent manner. For example, a plurality of first training samples with a first label may be input into an initial prediction model, a loss function may be constructed from the first label and a result of the initial prediction model, and parameters of the initial prediction model may be iteratively updated based on the loss function. When the loss function of the initial prediction model satisfies a predetermined iteration condition, the training of the model is completed and a trained prediction model is obtained. The predetermined iteration condition may be that the loss function converges, a count of iterations reaches a threshold, and so on.

In some embodiments, the first training sample includes a sample submarine environment feature map, which may be constructed based on historical data. The nodes and attributes of the nodes of the sample submarine environment map, edges and attributes of the edges of the sample submarine environment feature map are similar to the above description. The first label is whether a failure has occurred at an actual pipeline corresponding to the first training sample, which may be determined based on historical construction data. For example, the first label is labeled 1 if the failure has occurred at the pipeline and 0 if the failure has not occurred at the pipeline.

The predetermined abnormality condition is a condition predetermined for determining whether to generate the early warning information. For example, the predetermined abnormality condition is that the predicted future abnormality probability is greater than the predetermined probability threshold, which may be predetermined by staff or processors based on historical experience.

In some embodiments, in response to the determination that the predicted future abnormality probability satisfies the predetermined abnormality condition, the processor determines the predicted future abnormality probability and a pipeline corresponding to the predicted future abnormality probability as the early warning information and sends the early warning information to the remote control center. For example, the early warning information reads "a certain submarine pipeline segment is in an abnormal condition with a predicted abnormality probability of 70%".

The remote control center is a control center used to receive and process the early warning information remotely. Exemplarily, the remote control center is a control room, an emergency response room, or the like. The processor may send the early warning information to the remote control center by various feasible means. (e.g., wireless network)

In some embodiments of the present disclosure, analyzing and processing the submarine environment feature map by means of the prediction model can improve the processing efficiency of data, accurately predict the predicted future probability of abnormality of the submarine pipeline, and generate the early warning information and sending the early early warning information to the remote control center, henceforth timely reminding the staff to carry out processing and maintenance of the pipeline.

Wind and waves may affect a normal operation of submarine pipelines, and the submarine pipelines may confront safety hazards such as breakage, especially under severe weather conditions such as storms and huge waves. Therefore, in some embodiments of the present disclosure, determining the early warning information by the sequence of sea current features enables timely detection of a potential safety hazard of the submarine pipelines, and enables staff to take a timely emergency measure to manage and maintain the submarine pipelines.

In some embodiments, the protective device further includes a plurality of acoustic wave assemblies, the plurality of acoustic wave assemblies being spaced apart along an axial direction of the protective casing, and the acoustic wave assembly including an acoustic wave transmitting unit and an acoustic wave receiving unit.

The acoustic wave assembly is a component of the protective device that is used to transmit and receive acoustic waves. The acoustic wave assembly includes at least one acoustic wave assembly. In some embodiments, the acoustic wave assembly transmits probing acoustic waves via the acoustic wave transmitting unit and receives reflected echoes via the acoustic wave receiving unit. The probing acoustic waves are sound waves used to probe for fish schools, and the reflected echoes are probing acoustic waves that are reflected back by an obstruction (e.g., fish schools, reefs).

In some embodiments, data obtained by the acoustic wave assembly may be sent to the processor for processing.

Figure 7:
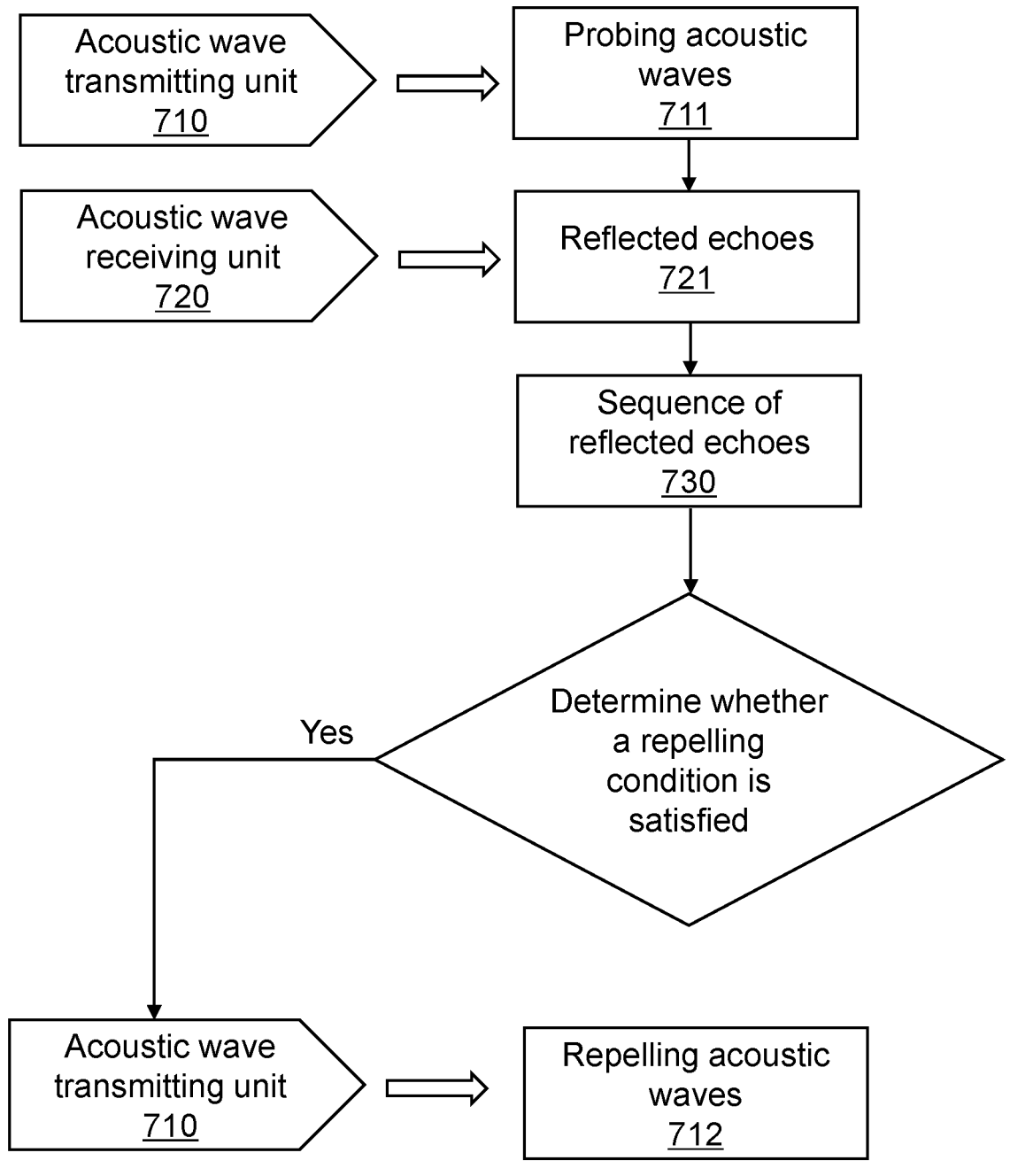
FIG. 7 is a schematic diagram illustrating an exemplary transmission of repelling acoustic waves according to some embodiments of the present disclosure.

FIG. 7 is a schematic diagram illustrating an exemplary transmission of repellent acoustic waves according to some embodiments of the present disclosure.

Referring to FIG. 7, in some embodiments, a processor may control an acoustic wave transmitting unit 710 to transmit probing acoustic waves 711 at a predetermined period and control an acoustic wave receiving unit 720 to receive reflected echoes 721; determine whether a predetermined repelling condition is satisfied based on a sequence of reflected echoes 730; and in response to a determination that the predetermined repelling condition is satisfied, send a repelling instruction to the acoustic wave transmitting unit 710 to control the acoustic wave transmitting unit 710 to transmit repelling acoustic waves 712.

The predetermined period is a predetermined period for the acoustic wave transmitting unit to transmit the probing acoustic wave, which may be predetermined by staff or processor based on historical experience.

In some embodiments, the predetermined period is associated with a sequence of sea current features. For example, the greater the average current strength in the sequence of sea current features, the shorter the predetermined period. It should be understood that the swimming of the fish school leads to the flow of seawater, so if it is monitored that the average current strength in the sequence of sea current features increased compared to the usual, it may be that there is a fish school around the submarine pipeline, and at this time the predetermined period for the acoustic wave transmitting unit to transmit the probing acoustic waves may be shortened, in order to increase the timeliness and sensitivity of detecting the fish school.

An illustration of the sequence of sea current features and the current strength can be found in FIG. 6 and its associated illustrations.

A sequence of reflected echoes is a sequence consisting of reflected echo data. The reflected echo data is data information related to a reflected echo received by the acoustic wave receiving unit. In some embodiments, the reflected echo data includes a reflected echo strength, a reflected echo duration, or the like. In this case, the reflected echo strength is an acoustic strength of acoustic waves that are reflected back (i.e., the reflected echoes). The reflected echo duration is a length of time that elapses from a time that the acoustic wave transmitting unit transmits the probing acoustic wave to a time that the acoustic wave receiving unit receives the reflected echoes.

In some embodiments, the processor constitutes the sequence of reflected echoes based on the reflected echoes received by the acoustic wave receiving unit. For example, the sequence of reflected echoes is {(x1, y1), (x2, y2), . . . }, wherein (x1, y1) and (x2, y2) denote a reflected echo data received by the acoustic wave receiving unit for the first time and for the second time, respectively; x1 is a reflected echo strength of reflected echoes received by the acoustic wave receiving unit for the first time, and x2 is a reflected echo strength of reflected echoes received by the acoustic wave receiving unit for the second time; y1 is a reflected echo duration of the reflected echoes received by the acoustic wave receiving unit for the first time, and y2 is a reflected echo duration of the reflected echoes received by the acoustic wave receiving unit for the second time.

The predetermined repelling condition refers to a condition used to determine whether to send the repelling instruction. For example, the predetermined repelling condition is that a fish school exists within a predetermined range of a submarine pipeline and the fish school moves towards the submarine pipeline. The predetermined repelling condition and the predetermined range may be predetermined by the staff or processor based on historical experience.

In some embodiments, the processor may determine a distance between the fish school and the submarine pipeline and a movement direction of the fish school based on the sequence of reflected echoes, and determine whether the predetermined repelling condition is satisfied based on the distance between the fish school and the submarine pipeline and the movement direction of the fish school. When the distance between the fish school and the submarine pipeline is less than the predetermined distance range and the movement direction of the fish school is close to the submarine pipeline, the processor may determine that the sequence of reflected echoes satisfies the predetermined repelling condition.

In some embodiments, the processor may determine the distance between the fish school and the submarine pipeline and the movement direction of the fish school based on the sequence of reflected echoes by means of vector retrieval. For example, the processor may construct a vector to be matched based on the sequence of reflected echoes. The processor may retrieve in a vector database based on the vector to be matched, obtain a reference vector whose vector distance from the vector to be matched is less than a distance threshold, determine a distance between a historical fish school and the submarine pipeline, and a movement direction of the historical fish school corresponding to the reference vector as a current desired distance between the fish school and the submarine pipeline, and the movement direction of the fish school. The vector database stores a plurality of reference vectors and distances between historical fish schools corresponding to the plurality of reference vectors and the submarine pipeline, and movement directions of the historical fish schools. The reference vector is constructed based on a historical sequence of reflected echoes, the distance between the historical fish school and the submarine pipeline corresponding to the reference vector is a distance between an actual fish school and the submarine pipeline corresponding to the historical sequence of reflected echoes, and a movement direction of the historical fish school is a movement direction of the actual fish school corresponding to the historical sequence of reflected echoes.

In some embodiments, the processor performs a coarse identification on the sequence of reflected echoes by a predetermined algorithm to determine a coarse identification result; in response to a determination that the coarse identification result satisfies a predetermined identification condition, the processor performs a precise identification by a biometric model to determine a fish school distribution feature within a predetermined range of the submarine pipeline; and determines whether the predetermined repelling condition is satisfied based on the fish school distribution feature.

The predetermined algorithm is a predetermined algorithm for the coarse identification of the sequence of reflected echoes. In some embodiments, the predetermined algorithm includes coarsely identifying the sequence of reflected echoes by one or more predetermined rules.

The predetermined rule is used to determine whether the fish school is present within the predetermined range of the submarine pipeline. The predetermined rule may be predetermined by the staff or processor based on historical experience. For example, the predetermined rule may be that a reflected echo duration of acoustic waves received by the acoustic save receiving unit in a certain direction is less than a reflected echo duration of previously received reflected echoes and a difference in duration between the two is greater than a predetermined difference threshold. This condition indicates the fish school is present within the predetermined range in that direction, and the fish school reflects the probing acoustic waves, thus shortening the reflected echo duration. As another example, the predetermined rule may be: the reflected echo duration of the acoustic waves received by the acoustic save receiving unit in a certain direction is less than the reflected echo duration of the previously received reflected echoes, and the difference in duration between the two is greater than the predetermined difference threshold; at the same time, a reflected acoustic wave duration received by the acoustic wave receiving unit in a plurality of consecutive directions also undergoes a shortening of the previously-described reflected echo duration. This situation indicates that the fish school is present within the predetermined range in that direction and that the fish school is swimming at a certain rate in the vicinity. The predetermined difference threshold may be predetermined by the staff or processor based on historical experience.

The coarse identification may initially determine whether the fish school is present within the predetermined range of the submarine pipeline. The coarse identification result is a result of judging whether the fish school is present within the predetermined range of the submarine pipeline. In some embodiments, the coarse identification result may be expressed in terms of probability. A higher probability indicates that the submarine pipeline is more likely to have a fish school within the predetermined range.

The predetermined identification condition is a condition that is predetermined for determining whether to perform the precise identification. For example, the predetermined identification condition is that the coarse identification result is greater than a predetermined probability threshold indicates that the submarine pipeline is likely to have the fish school within the predetermined range; a gradual increase in the coarse identification result indicates that the fish school is gradually approaching the submarine pipeline. Therefore, when the coarse identification result satisfies the predetermined identification condition, the precise identification is required.

In some embodiments, the processor may perform the precise identification by the biometric model.

The biometric model is a model used to characterize a distribution of the fish school. In some embodiments, the biometric model may be any one or a combination of a Deep Neural Network (DNN) model, a Convolutional Neural Network (CNN) model, etc., or other customized model structures, etc.

In some embodiments, an input to the biometric model includes transmission parameters of the acoustic wave transmitting unit, a location of the acoustic wave receiving unit, and the sequence of reflected echoes; and an output includes a fish school feature.

The transmission parameters are parameter data of the probing acoustic waves transmitted by the acoustic wave transmitting unit. For example, the transmission parameters include an acoustic wave transmission direction, an acoustic wave transmission frequency, an acoustic wave transmission strength, or the like.

The location of the acoustic wave receiving unit is a location of the acoustic wave receiving unit in a predetermined spatial coordinate system. In some embodiments, the processor may predetermine the spatial coordinate system, the spatial coordinate system uses a submarine pipeline or any certain location around the submarine pipeline as an origin, and the spatial coordinate system includes 8 quadrants, at which time the location of the acoustic wave receiving unit is a location in the spatial coordinate system, which may be expressed in spatial coordinates.

A description of the sequence of reflected echoes can be found in the previous related description.

The fish school distribution feature is data information related to the distribution of the fish school. In some embodiments, the fish school distribution feature includes a size and movement trend of a fish school in each quadrant. The size of the fish school includes a count and size of fish school the fish school, and the movement trend includes a movement rate and movement direction of the fish school.

In some embodiments, the biometric model may be obtained by training a large amount of second training samples with a second label by various methods. For example, the biometric model may be trained based on a gradient descent method. The biometric model is trained in a similar way to a prediction model as described above.

In some embodiments, the second training sample includes sample transmission parameters, a location of a sample acoustic wave receiving unit, and a sample sequence of reflected echoes. In some embodiments, the second label is an actual fish school distribution feature corresponding to the second training sample. In some embodiments, the second training sample and the second label may be generated based on field (i.e., undersea) testing, or tested in a simulated environment (e.g., the simulated environment includes an artificial pool that is close to an undersea environment). In the test, actual transmission parameters, a location of an actual acoustic wave receiving unit, and an actual sequence of reflected echoes may be used as the second training sample, and an actual fish school feature corresponding to the second training sample may be determined by employing a high-clear-water underwater camera and labeled as the second label.

In some embodiments, the processor may determine the size and movement trend of the fish school within the predetermined range of the submarine pipeline based on the fish school distribution feature, and determine whether the predetermined repelling condition is satisfied based on the size and movement trend of the fish school within the predetermined range of the submarine pipeline. For example, when there is the fish school within the predetermined range of the submarine pipeline, the size of the fish school is larger than a predetermined count threshold, and the movement trend of the fish school is toward the submarine pipeline, it is determined that the predetermined repelling condition is satisfied. The predetermined count threshold may be predetermined by a system or by a human.

In some embodiments of the present disclosure, the fish school distribution feature is identified by means of the coarse identification followed by the precise identification, instead of using a high-energy-consuming identification method (e.g., the above-mentioned high-clear-water underwater camera), which effectively saves arithmetic power to avoid a large amount of energy consumption, and prevents identifying the fish school feature by means of the high-energy-consuming identification method even when there is no fish school for a long period of time within the predetermined range of the submarine pipeline.

In some embodiments, the processor may in response to a determination that the predetermined repelling condition is satisfied, send the repelling instruction to the acoustic wave transmitting unit to control the acoustic wave transmitting unit to transmit the repelling acoustic waves.

The repelling instruction is a command for controlling the transmitting unit to transmit the repelling acoustic waves. For example, the repellent command would be "transmit acoustic waves at a frequency of 3 kHz and an acoustic energy (i.e., acoustic pressure level) of 150 dB re 1 μPa". The processor sends the repelling instruction to the transmitting unit by means of wired or wireless transmission (e.g., a 5G signal).

The repellent acoustic wave is an acoustic wave used to repel the fish school. In some embodiments, the acoustic wave transmitting unit determines a repelling acoustic waves frequency and a repelling acoustic waves energy based on the repelling instruction and transmits the repelling acoustic waves at the repelling acoustic waves frequency and the repelling acoustic waves energy to the fish school outside the submarine pipeline. A difference between the probing acoustic waves and the repelling acoustic waves is that they have different acoustic frequencies and acoustic energies.

In some embodiments of the present disclosure, the fish school may impact the submarine pipeline and thereby cause damage, and by determining when the sequence of reflected echoes satisfies the predetermined repelling condition, the acoustic wave transmitting unit is controlled to transmit the repelling acoustic waves, so as to enable a protective device to repel the fish school and to avoid damage to the submarine pipeline by the fish school.

The basic concepts have been described above, and it will be apparent to those skilled in the art that the foregoing detailed disclosure is intended as an example only and does not constitute a limitation of the present disclosure. Although not expressly stated herein, a person skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

Also, the present disclosure uses specific words to describe the embodiments of the present disclosure. For example, "an embodiment", "one embodiment", and/or "some embodiments" means a feature, structure, or characteristic associated with at least one embodiment of the present disclosure. Accordingly, it should be emphasized and noted that "an embodiment" "one embodiment" or "an alternative embodiment" referred to two or more times in different places in the present disclosure do not necessarily refer to the same embodiment. In addition, certain features, structures, or characteristics of one or more embodiments of the present disclosure may be suitably combined.

Similarly, it should be noted that in order to simplify the present disclosure, and thereby aid in the understanding of one or more embodiments of the invention, the preceding description of embodiments of the present disclosure sometimes incorporates a variety of features into a single embodiment, accompanying drawings, or description thereof. However, this method of disclosure does not imply that the object of the present disclosure requires more features than those mentioned in the claims. Rather, claimed subject matter may lie in less than all features of a single foregoing disclosed embodiment.

Some embodiments use numbers to describe the count of components, attributes, and it should be understood that such numbers used in the description of the embodiments are modified in some examples by the modifiers "approximately", "about", or "generally". Unless otherwise stated, "approximately", "about" or "generally" indicates that a variation of ±20% is permitted. Accordingly, in some embodiments, the numerical parameters used in the present disclosure and claims are approximations, which may change depending on the desired characteristics of the individual embodiment. In some embodiments, the numerical parameter should take into account a specified count of valid digits and use a general place-keeping method. Although the numerical domains and parameters used to confirm the breadth of their ranges in some embodiments of the present disclosure are approximations, in specific embodiments, such values are set as precisely as possible within the feasible range.

With respect to each patent, patent application, patent application disclosure, and other material, such as articles, books, manuals, publications, documents, etc., cited in the present disclosure, the entire contents thereof are hereby incorporated herein by reference. Historical application documents that are inconsistent with or conflict with the contents of the present disclosure are excluded, as are documents that limit the broadest scope of the claims of the present disclosure. It should be noted that in the event of any inconsistency or conflict between the descriptions, definitions, and/or use of terminology in the materials appended to the present disclosure and those described in the present disclosure, the descriptions, definitions, and/or use of terminology in the present disclosure shall prevail.

Finally, it should be understood that the embodiments described in the present disclosure are intended only to illustrate the principles of the embodiments of the present disclosure. Other deformations may also fall within the scope of the present disclosure. Thus, by way of example and not limitation, alternative configurations of embodiments of the present disclosure may be considered consistent with the teachings of the present disclosure. Accordingly, the embodiments of the present disclosure are not limited to the embodiments expressly presented and described herein.

What is claimed is:

1. A protective device for a submarine pipeline, comprising an internal pipeline, wherein the protective device further comprises:

a protective casing disposed outside the internal pipeline, and a cavity body disposed between the protective casing and the internal pipeline; and at least one support explosion-proof assembly disposed in the cavity body; the support explosion-proof assembly including a plurality of support columns, the support columns disposed in the cavity body, one end of the support columns away from the protective casing supported on the internal pipeline, the plurality of the support columns disposed at intervals in a circumferential direction along the internal pipeline, and an explosion-proof baffle with elastic deformation capability disposed between two adjacent support columns; wherein a cushioning rubber pad is provided between the support columns and the internal pipeline.

2. The protective device of claim 1, wherein the protective device comprises a plurality of support explosion-proof assemblies disposed at intervals along an axial direction of the internal pipeline, and a buffer space is disposed between two adjacent support explosion-proof assemblies.

3. The protective device of claim 1, wherein the explosion-proof baffle has a trapezoidal cross-section along a radial direction of the internal pipeline, and a lower bottom edge of the explosion-proof baffle is connected to an inner peripheral wall of the protective casing.

4. The protective device of claim 3, wherein a first buffer chamber is provided between waist edges of both sides of the explosion-proof baffle and a support column corresponding to the explosion-proof baffle, and a second buffer chamber is provided between an upper bottom edge of the explosion-proof baffle and the internal pipeline.

5. The protective device of claim 4, wherein the upper bottom edge of the explosion-proof baffle is curved.

6. The protective device of claim 1, wherein a silicone layer is provided on an inner peripheral wall of the protective casing and on an outer peripheral wall of the internal pipeline.

7. The protective device of claim 1, wherein the protective casing is a Huff structure.

8. The protective device of claim 1, wherein the protective casing is provided with a connecting flange, the connecting flange is provided with a threaded groove hole, and the threaded groove hole is provided with a bolt.

9. The protective device of claim 8, wherein the connecting flange is provided with a sealing groove.

10. The protective device of claim 2, wherein a pressure sensor is provided in the buffer space.

11. The protective device of claim 1, wherein the protective device further comprises at least one processor and at least one outer sensor, the at least one outer sensor is deployed on the protective casing and in contact with seawater, the at least one outer sensor includes at least one of a vibration sensor, a pressure sensor, and a flow rate sensor; and the at least one processor is configured to:

determine a sequence of sea current features around the submarine pipeline based on sensing data obtained by the at least one outer sensor; and determine early warning information based on the sequence of sea current features.

12. The protective device of claim 11, wherein the at least one processor is configured to:

determine a predicted future abnormality probability of the submarine pipeline based on a submarine environment feature map through a prediction model, the prediction model being a machine learning model, and the submarine environment feature map being constructed based on a spatial location distribution of the submarine pipeline; and in response to the predicted future abnormality probability satisfying a predetermined abnormality condition, generate the early warning information and sending the early warning information to a remote control center.

13. The protective device of claim 11, wherein the protective device further comprises a plurality of acoustic wave assemblies, the plurality of acoustic wave assemblies are disposed at intervals along an axial direction of the protective casing, the plurality of acoustic wave assemblies includes an acoustic wave transmitting unit and an acoustic wave receiving unit; and the at least one processor is further configured to:

control the acoustic wave transmitting unit to transmit probing acoustic waves at a predetermined period, and control the acoustic wave receiving unit to receive reflected echoes;

determine whether a predetermined repelling condition is satisfied based on a sequence of reflected echoes, the sequence of reflected echoes being formed based on the reflected echoes received by the acoustic wave receiving unit; and in response to the predetermined repelling condition being satisfied, send a repelling instruction to the acoustic wave transmitting unit to control the acoustic wave transmitting unit to transmit repelling acoustic waves.

14. The protective device of claim 13, wherein the at least one processor is further configured to:

perform a coarse identification on the sequence of reflected echoes using a predetermined algorithm to determine a coarse identification result;

in response to the coarse identification result satisfying a predetermined identification condition, perform a precise identification through a biometric model to determine a fish school distribution feature within a predetermined range of the submarine pipeline; and determine whether the predetermined repelling condition is satisfied based on the fish school distribution feature.

\* \* \* \* \*